United States Patent
Dai et al.

(10) Patent No.: US 8,082,513 B2
(45) Date of Patent: Dec. 20, 2011

(54) METHOD AND SYSTEM FOR SAVING IMAGES FROM WEB PAGES

(75) Inventors: Lung Dai, Taipei Hsien (TW); Wang-Chang Duan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 360 days.

(21) Appl. No.: 12/399,024

(22) Filed: Mar. 6, 2009

(65) Prior Publication Data
US 2009/0228480 A1 Sep. 10, 2009

(30) Foreign Application Priority Data
Mar. 6, 2008 (CN) .......................... 2008 1 0300484

(51) Int. Cl.
*G06F 3/048* (2006.01)
(52) U.S. Cl. ......... 715/769; 715/764; 715/230; 715/233
(58) Field of Classification Search .................. 715/764, 715/769, 230, 233; 382/305
See application file for complete search history.

(56) References Cited

U.S. PATENT DOCUMENTS

| | | | |
|---|---|---|---|
| 6,993,712 B2 * | 1/2006 | Ramachandran et al. | 715/234 |
| 7,222,161 B2 * | 5/2007 | Yen et al. | 709/217 |
| 7,685,531 B2 * | 3/2010 | Yeung et al. | 715/769 |
| 2003/0065638 A1 * | 4/2003 | Robert | 707/1 |
| 2004/0103364 A1 * | 5/2004 | Dornback | 715/501.1 |
| 2008/0295010 A1 * | 11/2008 | Bobbitt | 715/764 |

OTHER PUBLICATIONS

"Drop Text Off Image", http://lifehacker.com, Posted Jan. 4, 2007, http://lifehacker.com/#!2259531/firefox-quick-tip-drag-and-drop-url-text, 2 pages.*
"Save Text As File Name", Microsoft Office Word 2003, Dec. 31, 2003, 1 page.*
Browsers Gathered in the House of Beautiful lilies; CHIP; 2006; p. 163; vol. 12; www.chip.cn; China; Document received from China Patent Office (Part of document translated from Chinese to English, please see enclosed document for translation).
Readme; TextCapture IIV2.1.0.4; Apr. 20, 2007; p. 1; China; Document received from China Patent Office (Part of document translated from Chinese to English, please see enclosed document for translation).

* cited by examiner

*Primary Examiner* — Doon Chow
*Assistant Examiner* — Toan Vu
(74) *Attorney, Agent, or Firm* — Altis Law Group, Inc.

(57) ABSTRACT

An exemplary method of saving images, the method comprising: selecting a set of characters displayed on the web page to be use as the name of the image to be saved; dragging and releasing the character set above the image. Saving the image with the character set being the name of the image file.

9 Claims, 2 Drawing Sheets

METHOD AND SYSTEM FOR SAVING IMAGES FROM WEB PAGES

BACKGROUND

1. Field of the Disclosure

The present disclosure relates to web pages, and particularly to a method and system for saving images from web pages.

2. Description of Related Art

Computers are often used to communicate with other computers over a network, and information, over these networks, may be available in the form of web pages. When the users want to save an image from a web page, the users may copy and paste the image to a file, and then save the file. The user may also move the cursor over the image, right-click the mouse or digitizer button to display a dialog box showing a menu of options one of which is a saving function. The user can then click on the saving function item to save the image. However, both methods are tedious and time consuming because a web page may have numerous images and the user must repeat the process of saving each image.

Therefore, an improved method and system for saving images on web pages are needed to address the aforementioned deficiency and inadequacies.

DETAILED DESCRIPTION OF THE EMBODIMENTS

References will now be made to the drawings to describe exemplary embodiments of the method and the system of saving images on the web pages.

Figure 1:
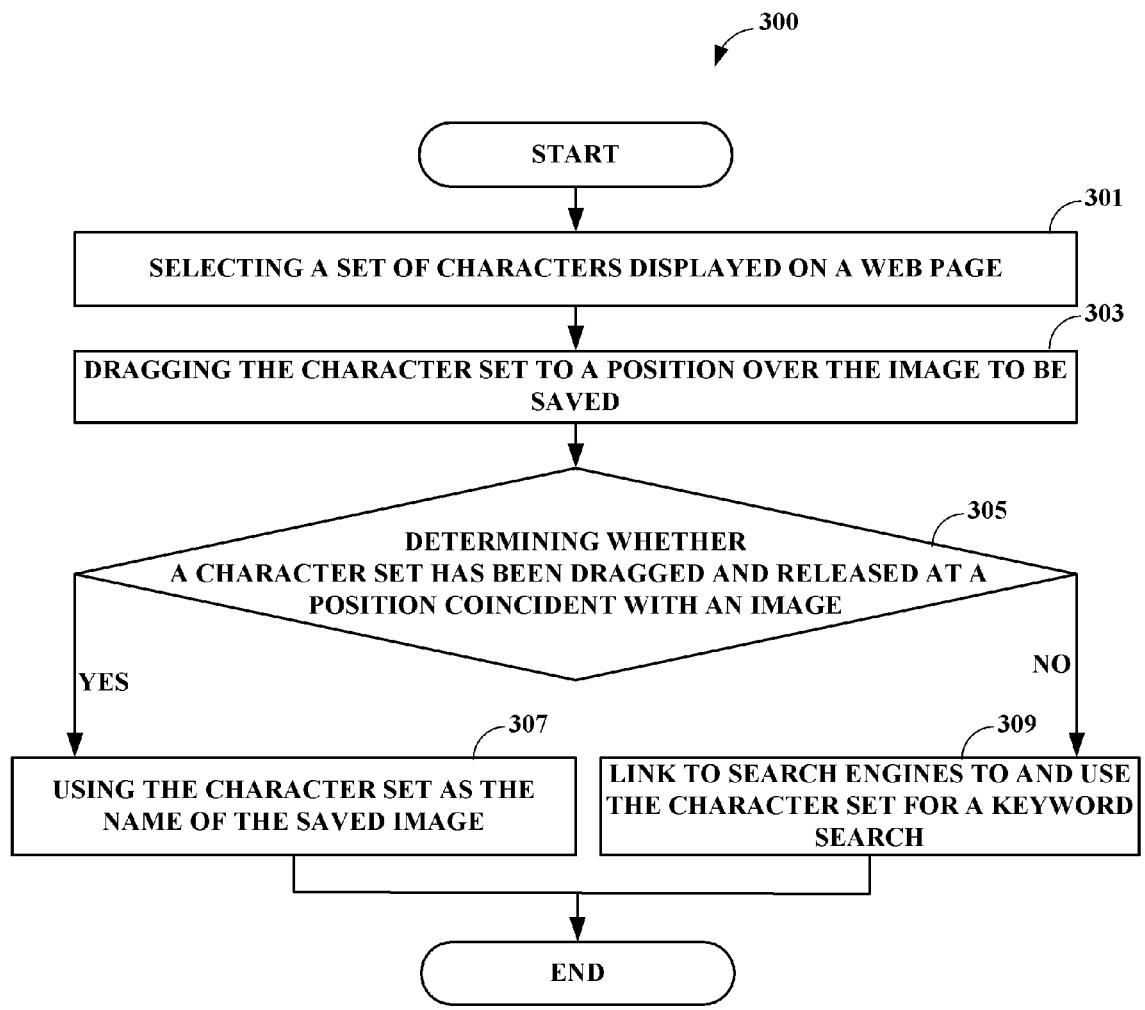
FIG. 1 is a flowchart illustrating a method of saving images on web pages in accordance with an exemplary embodiment.

Referring to FIG. 1, a saving method 300 is illustrated for saving images from web pages that are displayed in a display screen of a computer system. The saving method 300 includes the following steps.

In step S301, controlling a cursor on the display screen to select a set of characters displayed on a web page to be used as a name of an image to be saved.

In step S303, dragging the character set to a position over the image to be saved.

In step S305, determining whether the character set has been dragged and released at a position over an image. The determination can be achieved by obtaining cursor release coordinates after the cursor is released; and determining whether the obtained coordinates is covered with an image of the web page, if yes, go to step S307, otherwise go to step S309.

In step S307, the image is automatically save using the character set as the name of the file. The image may be stored in a default folder or a user-defined storage route. Generally, users can select any characters, thus characters and image may not actually relate to each other. In the embodiment, the set of characters is a name of the image that is located on the web page.

In step S309, link to one or more search engines and use the character set for a keyword search.

Figure 2:
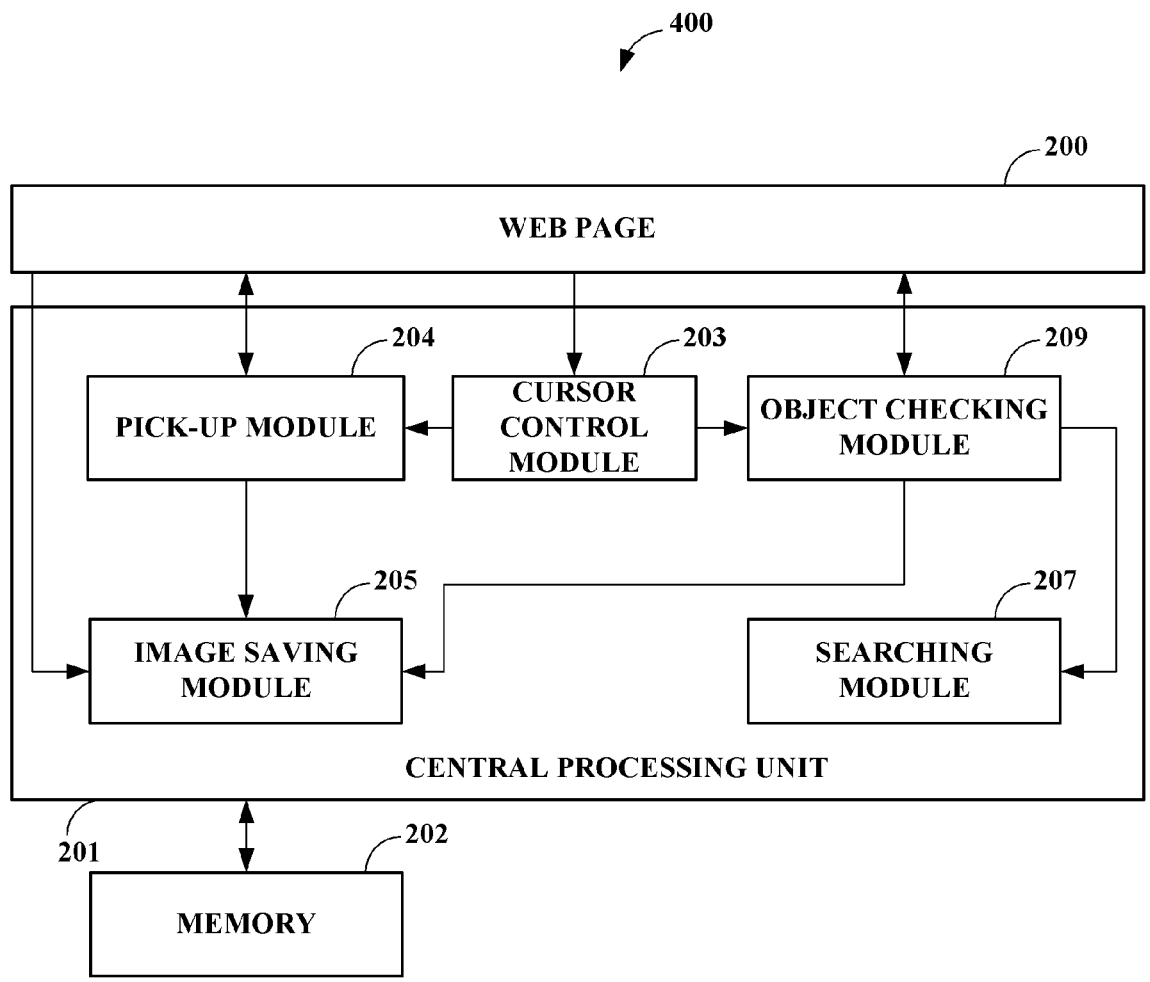
FIG. 2 is a schematic block diagram of a system of saving images on web pages in accordance with an exemplary embodiment.

Referring to FIG. 2, a saving system 400 is illustrated to implement the above mentioned saving method 300 in accordance with an exemplary embodiment. The saving system 400 includes a central processing unit (CPU) 201 and a memory 202 coupled to the CPU 201. The memory 202 stores instructions for downloading and saving images from web pages. When the instructions are executed by the CPU 201, the CPU 201 saves a selected image in the memory 202.

The CPU 201 includes a cursor control module 203, a pick-up module 204, an image saving module 205, a searching module 207 and an object checking module 209.

The cursor control module 203 is used for controlling a cursor on the display screen to select a set of characters displayed on a web page 200 to use as a name for an image to be saved, and dragging the character set to a position coincident with the image to be saved in response to a select and drag event of the cursor, and generating a detection signal when the cursor is released The pick-up module 204 is used for picking up the character set selected by the cursor control module 203 from the web page 200.

The image saving module 205 is used for receiving the character set from the pick-up module 204, and using the characters of the character set as the name of the saved image. The image may be stored by in a default folder according to requirements of the user.

The searching module 207 is used for linking to one or more search engines for acquiring required web pages according to a keyword by the name of the character set.

The object checking module 209 is used for determines whether the character set has been dragged and released at a position over an image in response to the detection signal received from the cursor control module 203, and signals the image saving module 205 to execute on condition that the position is determined to be over the image, and signals the searching module 207 to execute on condition that the position is determined to be notover the image. For example, the object checking module 209 obtains cursor release coordinates in response to the detection signal; and then determines whether the obtained coordinates is covered with an image of the web page. If the obtained coordinates is covered with an image of the web page, the object checking module 209 signals the image saving module 205 to execute. If the obtained coordinates is not covered with an image of the web page, the object checking module 209 signals the searching module 207 to execute.

It is to be understood, however, that even though numerous information and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A computer-enabled method of saving images from a web page, the method comprising:
   selecting a set of characters displayed on the web page to use as a name for an image to be saved;
   dragging the character set to a position over the image to be saved;
   determining the character set has been dragged and released at a position over the image; and
   using the character set as the name of the saved image automatically on condition that the final position of the character set is determined to be over the image.

2. The method according to claim 1, further comprising a step of: linking to a search engine to acquire web pages according to the character set on condition that the final position is not over the image.

3. The method according to claim 1, wherein the determination step comprises sub-steps of:
 obtaining cursor release coordinates after the cursor is released;
 determining whether the obtained coordinates is covered with an image of the web page.

4. A non-transitory computer readable medium containing executable instructions which, when executed in a central processing unit, causes the central processing unit to perform the steps for saving images from a web page comprising:
 selecting a set of characters displayed on the web page to use as a name for an image to be saved;
 dragging the character set to a position over the image to be saved;
 determining the character set has been dragged and released at a position over an image; and
 saving the image by the name of the character set automatically in a memory on condition that the final position of the character set is determined to be over the image.

5. The non-transitory computer readable medium according to claim 4, further comprising:
 linking to a search engine to acquire web pages according to the character set on condition that the final position is not over the image.

6. The non-transitory computer readable medium according to claim 4, wherein the determining process comprises sub-steps of:
 obtaining cursor release coordinates after the cursor is released;
 determining whether the obtained coordinates is covered with an image of the web page.

7. A system for saving images of a web page, the system comprising:
 a memory;
 a cursor control module for controlling a cursor on the display screen and to select a set of characters displayed on a web page to use as a name for an image to be saved, and dragging the character set to a position over the image to be saved in response to select and drag event of the cursor, and generating a detection signal when the cursor is released;
 a pick-up module for picking up the character set selected by the cursor control module;
 an image saving module for receiving the character set from the pick-up module, and using the
 characters of the character set as the name of the saved image in the memory; and
 an object checking module for determining the character set has been dragged and released at the position in response to the detection signal received from the cursor control module, and signals the image saving module to automatically save the image using the character set as the name of the saved image on condition that the final position of the character set is determined to be over the image.

8. The system according to claim 7, further comprising:
 a searching module for being signaled by the object checking module to link to a search engine for acquiring required web pages according to a keyword of the character set on condition that the final position of the character set is determined to be not over the image.

9. The system according to claim 7, wherein the object checking module obtains cursor release coordinates after the cursor is released; and then determines whether the obtained coordinates is covered with an image of the web page.

* * * * *